United States Patent Office 3,423,478
Patented Jan. 21, 1969

3,423,478
PROCESS FOR THE SEPARATION OF AN AROMATIC C₈-HYDROCARBON FRACTION
Hermann Zorn, 14 Ploesslgasse, Vienna 4, Austria, and Kurt Reisinger, Heidelberg-Dossenheim, Germany; said Reisinger assignor to said Zorn
No Drawing. Filed Nov. 22, 1965, Ser. No. 509,205
Claims priority, application Austria, Nov. 23, 1964,
A 9,901/64, A 9,902/64
U.S. Cl. 260—674                      10 Claims
Int. Cl. B01d 3/34; C07c 7/04, 15/08

ABSTRACT OF THE DISCLOSURE

A process for the separation of an aromatic $C_8$-hydrocarbon fraction, which contains m-xylene and p-xylene and ethyl benzene, wherein the fraction is treated in substantially anhydrous formic acid with a chlorinating agent and that portion of said fraction which had not reacted with said chlorinating agent is separated by distillation from the resulting chlorination product of m-xylene. In order to obtain m-xylene in a pure condition, the chlorination product is dehalogenated and, if desired, isomerized and the fraction free of m-xylene, containing p-xylene and ethyl benzene, is then separated by converting ethyl benzene into styrene.

---

When processing tar and petroleum as well as in gasoline-reforming-processes, technical hydrocarbon fractions are obtained which contain a mixture of aromatic $C_8$-hydrocarbons, namely o-xylene, p-xylene, m-xylene, and ethyl benzene. Depending on its origin, the technical hydrocarbon fraction may contain a larger or smaller proportion of each kind of hydrocarbons. Whereas o-xylene is easily separable from the fraction by distillation, as it has a higher boiling point (B.P. 144.4° C.), the other three hydrocarbons, m-xylene, p-xylene and ethyl benzene, are hardly separable by distillation, as their boiling points all lie within the range of 136 to 139° C. However, the recovery of pure p-xylene, m-xylene and ethyl benzene, respectively, represents an important task, from the technical point of view, because all four hydrocarbons are starting materials for important branches of the manufacture of synthetics. P-xylene is the starting material for terephthalic acid, m-xylene the starting material for isophthalic acid, and ethyl benzene the starting material for styrene. The previous method of separating these $C_8$-hydrocarbons comprises removing p-xylene upon crystallization at −70° C. This separation is not a quantitative separation, because 20 to 30% of the p-xylene remains in the mixture, and this method also requires costly equipment and involves a considerable expenditure of work and energy.

The invention has as its object to avoid these disadvantages and difficulties by providing a process by which the quantitative separation of m-xylene from a technical fraction containing aromatic $C_8$-hydrocarbons is possible. Another object of the invention is to recover in a pure condition the m-xylene separated from this fraction as well as the components remaining in the fraction.

The process according to the invention comprises treating the fraction, which contains m-xylene, p-xylene and eventually ethyl benzene, in substantially anhydrous formic acid with a chlorinating agent and separating that portion of the fraction which had not reacted with the chlorinating agent by distillation from the resulting chlorination product of the m-xylene, whereupon, in order to obtain m-xylene in a pure condition, the chlorination product may be dehalogenated and, if desired, isomerized and the fraction free of m-xylene, containing p-xylene and ethyl benzene, may then be separated by converting ethyl benzene into styrene.

When the fraction is treated, according to the invention, with a chlorinating agent in substantially anhydrous formic acid, a chlorination product of m-xylene is quantitatively obtained, while p-xylene, ethyl benzene, and o-xylene, if any, are not affected by the chlorinating agent. The resulting chlorination product of the m-xylene has a substantially higher boiling point (184 to 186° C. under normal pressure) than p-xylene and ethyl benzene which are not affected by the chlorinating agent. It is therefore possible to distill those two hydrocarbons in a simple manner from the reaction mixture.

Preferably, gaseous chlorine or substituted aryliodide dichlorides are used as chlorinating agents.

The chlorination may be effected at a temperature below 30° C., preferably below 15° C.

In order to achieve a quick reaction, it is necessary to keep the $C_8$-hydrocarbons, which are almost insoluble in anhydrous formic acid, in very fine, emulsion-like dispersion during the chlorination, which may be done by stirring.

During the chlorination, care has to be taken to provide for a good gas distribution when using gaseous chlorine. The gas introduction rate must be so chosen that the chlorine is immediately completely consumed; no yellowing caused by an excess of chlorine must occur. By using aryliodide dichlorides of the formula $ArICl_2$ any excess of chlorine in the reaction mixture can very effectively be avoided. These aryliodide dichlorides may be easily prepared by addition of chlorine to aryl iodide, according to the formula:

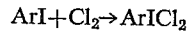
$$ArI + Cl_2 \rightarrow ArICl_2$$

and they easily give off the loosely bound chlorine to chlorinable hydrocarbons, according to the formula:

$$ArICl_2 + Ar'H \rightarrow ArI + Ar'Cl + HCl$$

It has been found that in the chlorinating process according to the invention only monochloric products are obtained. Chlorinating agents which have proved particularly suitable are those aryliodide dichlorides which have highly electrophilic substituents, such as, for example, —$NO_2$, —CN, —COOH, etc., in their aromatic nuclei. These substituents impart to the aryliodide dichlorides a higher stability so that any intramolecular rearrangements will not occur. Particularly suitable are those compounds which have one of the above-mentioned substituents in m-position to the iodine, e.g. 3-nitrophenyliodide dichloride. After having given off the chlorine, the remaining 3-nitrophenyl-iodide may be re-converted into iodo dichloride by treating it with chlorine and may then be recycled. Since all of the process steps are quantitative, any losses in substance are due to purity failures that may occur during processing.

The chlorination temperature should, as already mentioned, be below 30° C., preferably between 5 and 15° C. The presence of catalytically effective substances, such as, for example, traces of metals, metal halogenides, iodine, should be avoided. Daylight has no influence on the course of the reaction. The amount of formic acid should be 2–3 mols per 1 mol of hydrocarbons. It is not necessary that the formic acid is completely anhydrous; 1–3% of water are even favourable for the reaction.

After the chlorination is completed, the formic acid is removed by separation of layers: the upper layer contains the chlorinated m-xylene and non-chlorinated p-xylene as well as ethyl benzene and o-xylene, if any; the lower layer contains the formic acid with traces of hydrocarbons; it may immediately be used again, after the hydrogen chloride solved therein has been outgassed. The non-chlorinated p-xylene and ethyl benzene are separated from the higher boiling chlorination products by distillation, as described in detail in the examples. Subsequently, the chlorination products may be dehalogenated in a manner known per se, e.g. by hydrogenation with the aid of a platinum/charcoal catalyst, and pure m-xylene may be recovered which may then be isomerized, if desired.

The fraction separated from the chlorination products, which contains p-xylene and ethyl benzene but no m-xylene, is then further treated in such manner that either the mixture is directly catalytically dehydrogenated to give styrene and/or the mixture is completely catalytically hydrogenized to give the respective alkyl cyclohexanes, the hydrogenation products are separated by distillation and each of them is catalytically dehydrogenized individually. As far as o-xylene is present, it is removed by distillation beforehand.

Suitably the dehydrogenation of the ethyl group to obtain styrene is effected in a known manner by means of an iron oxide/chromium oxide catalyst and steam at temperatures above 500° C.

The dehydrogenation of the alkyl cyclohexanes may be effected in a manner known per se by means of a platinum/charcoal catalyst without pressure.

According to an embodiment of the invention, the process may be conducted in three steps by effecting, in the first step, the dehydrogenation of the ethyl group to give styrene, completely catalytically hydrogenizing the non-reacted ethyl benzene together with p-xylene in the second step, whereupon in the third step the dehydrogenation of the hydrogenation products is carried out. The dehydrogenation of ethyl benzene is not a quantitative reaction, whereas the complete hydrogenation to give the alkyl cyclohexanes and the subsequent dehydrogenation of the same is a reaction producing a 100% yield. Styrene has a boiling point of 145.8° C., 1,4-dimethyl cyclohexane in its trans-form has a boiling point of 119.4° C. and in its cis-form, which is present only in small quantities, a boiling point of about 124° C., while ethyl cyclohexane has a boiling point of 130° C. It is thus evident that the separation by distillation either of styrene from a p-xylene/ethyl benzene mixture or of the cyclohexanes involves no difficulties.

In the following examples the process of the invention is explained in more detail, Examples 1 and 2 illustrating the isolation and recovery in pure condition of m-xylene from a $C_8$-hydrocarbon fraction, and Examples 3 and 4 demonstrating the processing of a mixture comprising p-xylene and ethyl benzene, i.e. a mixture from which m-xylene has already been removed.

EXAMPLE 1

200 parts by weight of a xylene fraction, consisting of

| | Parts by weight |
|---|---|
| m-Xylene | 55.0 |
| p-Xylene | 18.8 |
| o-Xylene | 2.2 |
| Ethyl benzene | 24.0 |
| | 100.0 | are treated in 300 parts by weight of 98% formic acid with 37 parts by weight of gaseous chlorine under vigorous stirring at a temperature of +15° C. The chlorine is introduced at a rate of 150 parts by volume of chlorine/min. After the reaction is completed (which can be recognized in that a sample of the reaction mixture treated with an aqueous potassium iodide solution does not show any brown colouring caused by liberated iodine), the formic acid is separated by decantation or centrifugation. The hydrocarbon layer is neutralized and fractionally distilled to give the two fractions:

(I) 54–56° C./36 torr, containing the aromatic $C_8$-hydrocarbons.

(II) 64–66° C./10 torr, containing the monochloric xylenes besides small amounts (approximately 1%) of higher chlorinated products.

Fraction I has the following composition:

| | Percent |
|---|---|
| p-Xylene | 37.4 |
| o-Xylene | 4.9 |
| Ethyl benzene | 57.7 |
| | 100.0 |

It is, therefore, not disadvantageous if the $C_8$-fraction also contains o-xylene in addition to the p-xylene and ethyl benzene. o-Xylene, when chlorinated, behaves exactly like p-xylene and ethyl benzene, i.e. it is not affected. On the other hand, it is also possible to separate o-xylene a priori from the $C_8$-fraction, that is before the chlorination, because, as already mentioned above, o-xylene has, with respect to the other $C_8$-hydrocarbons, a sufficiently different boiling point.

EXAMPLE 2

A mixture of 42 parts by weight of m-xylene and 18 parts by weight of p-xylene (m:p=70:30 mol%) is emulsified under vigorous stirring in 120 parts by weight of 99% formic acid, and then cooled to +12° C. Then 130 parts by weight of 3-nitrophenyliodide dichloride are added in portions. With brisk evolution of hydrogen chloride the chlorination reaction immediately takes place.

After the reaction is completed, the formic acid layer is separated, and the hydrocarbon layer is neutralized and fractionally distilled.

Three fractions are obtained:

(I) B.P. 53–55° C./36 torr, consisting of pure p-xylene, 15.5 parts by weight.

(II) B.P. 64–66° C./10 torr, consisting of monochloric xylenes, 52.3 parts by weight, containing: 4-chloro-m-xylene, 69.6%; 2-chloro-m-xylene, 25.8%.

(III) B.P. 143–144° C./10 torr, consisting of 3-nitro-iodobenzene.

For the recovery of pure m-xylene, the monochlorination product in gaseous condition may be passed together with hydrogen (in abundance) over a nickel or platinum catalyst (Ni on $Al_2O_3$ or Pt on charcoal) without pressure at a temperature of about 250 to 300° C. Thereby, the chlorine is substituted by hydrogen and is removed as hydrogen chloride. The reaction product is condensed, the gases washed with water, and the remaining hydrogen is recycled into the process. Then the reaction product is distilled without pressure. As forerunnings, pure m-xylene is obtained, while the last runnings consist of the non reacted chloroxylene, which is recycled into the process.

The isomerization of the m-xylene may be effected in a known manner by a treatment with anhydrous aluminum chloride and, if desired, by addition of small amounts of hydrogen chloride at an elevated temperature (61 to 80° C.). Thereby, part of the m-xylene is isomerized to p-xylene.

EXAMPLE 3

A mixture consisting of 40% p-xylene and 60% ethyl benzene is completely hydrogenated at 200 kg./sq. cm. gauge and a temperature of 150–160° C. by passing it over a nickel/aluminum solid catalyst to give the corresponding alkyl cyclohexanes. The resulting mixture consisting of 1,4-dimethyl cyclohexane (B.P. 119.4° C. and 124° C., respectively) and ethyl cyclohexane (B.P. 130° C.) is subjected to a fractional distillation, the two components obtained being pure. Subsequently, each component is dehydrogenized without pressure on a platinum/charcoal catalyst at a temperaure of 310–320° C. to give quantitatively pure p-xylene and pure ethyl benzene.

EXAMPLE 4

A mixture consisting of 35 parts of p-xylene and 65 parts of ethyl benzene is treated with steam in the presence of an iron oxide/chromium oxide catalyst at a temperature of 510° C. to give a mixture consisting of 30 parts of styrene, 35 parts of ethyl benzene besides the unchanged 35 parts of p-xylene. The mixture is fractionally distilled to give, as fore-runnings, 70 parts of a mixture consisting of p-xylene and ethyl benzene (50:50), whereas styrene remains in the column. The fore-runnings are subjected to the treatment described in Example 3 to give pure p-xylene and pure ethyl benzene. The latter may, if desired, be subjected to a repeated dehydrogenation to given styrene.

What we claim is:

1. A process for the separation of an aromatic $C_8$-hydrocarbon-fraction, which contains m-xylene and p-xylene, consisting essentially of treating the fraction in substantially anhydrous formic acid with a chlorinating agent and separating that portion of said fraction which had not reacted with said chlorinating agent by distillation from the resulting chlorination product of m-xylene.

2. The process set forth in claim 1, wherein the chlorinating agent used is gaseous chlorine.

3. The process set forth in claim 1, wherein the chlorinating agent used is an aryliodide dichloride.

4. The process set forth in claim 1, wherein the chlorination is effected at a temperature below 30° C.

5. The process set forth in claim 1, wherein said fraction is kept, during chlorinating, in very fine dispersion by stirring.

6. A process for the separation of an aromatic $C_8$-hydrocarbon fraction, which contains m-xylene, p-xylene, and ethyl benzene, consisting essentially of treating the fraction in substantially anhydrous formic acid with a chlorinating agent and separating that portion of said fraction which had not reacted with the chlorinating agent by distillation from the resulting chlorination product of m-xylene, whereupon, in order to obtain m-xylene in a pure condition, said chlorination product is dehalogenated.

7. The process set forth in claim 6, wherein following the dehalogenation of the chlorination product, the pure m-xylene obtained is isomerized.

8. A process for the separation of an aromatic $C_8$-hydrocarbon fraction containing m-xylene, p-xylene, and ethyl benzene, consisting essentially of treating the fraction in substantially anhydrous formic acid with a chlorinating agent and separating the non-reacted portion of the fraction by distillation from the resulting chlorination product of m-xylene, whereupon the fraction free of m-xylene and containing p-xylene and ethyl benzene is separated by converting ethyl benzene into styrene and distilling off the p-xylene.

9. The process set forth in claim 8, wherein the fraction free of m-xylene is directly catalytically dehydrogenized, using an iron oxide/chromium oxide catalyst and steam at temperatures above 500° C., whereupon styrene and p-xylene are separated by distillation.

10. The process set forth in claim 8, wherein the fraction free of m-xylene is completely catalytically hydrogenized to give the respective alkyl cyclohexanes, these hydrogenation products are separated by distillation and each of them is catalytically dehydrogenized individually, using a platinum/charcoal catalyst under atmospheric pressure.

References Cited

UNITED STATES PATENTS

| | | | |
|---|---|---|---|
| 2,282,231 | 5/1942 | Mattox | 260—674 |
| 2,532,276 | 12/1950 | Birch et al. | 260—674 |
| 2,656,397 | 10/1953 | Holzman et al. | 260—674 |
| 2,889,382 | 6/1959 | Wohlers | 260—674 |
| 3,075,021 | 1/1963 | Luvisi et al. | 260—668 |

DELBERT E. GANTZ, *Primary Examiner.*

C. E. SPRESSER, JR., *Assistant Examiner.*

U.S. Cl. X.R.

260—668, 669, 650; 203—29